United States Patent [19]

Kamoda

[11] Patent Number: 5,608,478
[45] Date of Patent: Mar. 4, 1997

[54] CAMERA WITH LOCK-CONTROLLING LENS BARRIER

[75] Inventor: Takashi Kamoda, Omiya, Japan

[73] Assignee: Fuji Photo Optical Co., Ltd., Saitama, Japan

[21] Appl. No.: 403,437

[22] Filed: Mar. 14, 1995

[30] Foreign Application Priority Data

| Jun. 16, 1994 | [JP] | Japan | 6-134225 |
| Jun. 16, 1994 | [JP] | Japan | 6-134226 |
| Jun. 16, 1994 | [JP] | Japan | 6-134229 |

[51] Int. Cl.⁶ ................................................ G03B 17/38
[52] U.S. Cl. ........................... 396/503; 396/448; 396/266
[58] Field of Search ................................ 354/187, 266, 354/288, 268

[56] References Cited

U.S. PATENT DOCUMENTS

| 3,810,227 | 5/1974 | Tanaka | 354/266 X |
| 4,019,192 | 4/1977 | Miyagawa | 354/187 |
| 4,396,270 | 8/1983 | Suzuki | 354/268 |
| 4,958,179 | 9/1990 | Komatsuzaki et al. | 354/195.12 |

*Primary Examiner*—Safet Metjahic
*Assistant Examiner*—J. K. Han

[57] ABSTRACT

A camera with a lens barrier is provided with a slide member, which moves together with the lens barrier over a certain range of motion. A locking portion for keeping a shutter button locked and a stopper for limiting the push-down movement amount of the shutter button are integrated in the slide member. When the lens barrier is positioned at a position other than an opening position, the locking portion prevents the shutter button from being pushed down. When the lens barrier is positioned at the opening position, the locking portion moves away from the shutter button so that the shutter button can be pushed down, and the stopper limits the push-down movement amount of the shutter button. Thus, the locking portion for keeping the shutter button locked and the stopper for limiting the push-down movement amount of the shutter button are integrated so that the number of parts can be decreased to simplify the structure and lower the production cost.

7 Claims, 8 Drawing Sheets

CAMERA WITH LOCK-CONTROLLING LENS BARRIER

BACKGROUND OF THE INVENTION

1. Field of the Invention

This invention relates to a camera with a lens barrier, more particularly to a camera with a lens barrier for covering and protecting a taking lens.

2. Description of the Related Art

A lens barrier, which is provided in a camera, moves back and forth between a closing position to cover a taking lens and an opening position retracting from the taking lens. A locking portion for a shutter button moves together with the lens barrier, and when the lens barrier is positioned at the closing position, the lock of the shutter button is released. And, in the case when the photographing is carried out with the lens barrier opened, the push-down movement amount of the shutter button is limited by a stopper.

The lens barrier is integrated with the locking portion, and when the lens barrier is positioned at the opening position, the locking portion moves to below the shutter button. As a result, the shutter button is kept locked by the locking portion. And, when the lens barrier moves in the direction of the opening position, the locking portion moves from below the shutter button in the direction of the opening position of the lens barrier. As a result, the lock of the shutter button is released.

Furthermore, for example, the strobe button of a film with a lens is integrated with a case made of synthetic resin, and the ON-OFF operation of a charge switch is performed by taking advantage of the elastic deformation of synthetic resin. That is, when the strobe button is pushed down, the strobe button is elastically deformed and is pushed down so that the charge switch can work. As a result, a capacitor for strobe is charged with a predetermined amount of the electricity. And, when the pushing force on the strobe button is released after charging, the strobe button returns to the condition before being operated.

However, in the conventional camera, the locking portion for locking the shutter button and the stopper for limiting the push-down movement amount of the shutter button are formed separately, so there is a problem in that many parts are required and the production cost cannot be reduced.

SUMMARY OF THE INVENTION

The present invention has been developed under the above-mentioned circumstances, and has as its aim the provision of the camera with a lens barrier, which can decrease the number of parts and lower the cost.

And, since the conventional locking portion is integrated with the lens barrier, the moving amount of the locking portion is the same as that of the lens barrier. However, the locking portion is movably stored in the camera case, so when the moving amount of the locking portion is the same as that of the lens barrier, the large movement space is needed in the camera case. As a result, there is a problem in that it is impossible to make the most use of the space in the camera case. There is also a problem in that if such a large space is secured in the camera case, the camera cannot be freely designed.

The present invention has been developed under the above described circumstances, and has as its aim the provision of the camera with the lens barrier which can minimize the moving space of the locking portion in the camera case so that it is possible to make better use of the space in the camera case and freely design the camera.

It is also possible to simplify the structure of the strobe button like a film with a lens, but even in the case that the photographing is not performed, the charge switch works and the capacitor for strobe is charged with a predetermined amount of electric charge. As a result, there is a problem in that when the photographer takes a picture without noticing that the capacitor for strobe is charged, the strobe emits light.

The present invention has been developed under above-described circumstances, and has as its aim the provision of the camera with the lens barrier which can simplify the structure of the strobe button and can prevent the strobe light-emitting portion from charging by locking the strobe button when the photographing is not performed.

To achieve the above-described objects, the present invention comprises a camera case provided with a taking lens, a lens barrier which is slidably supported at the front surface of the camera case and moves back and forth between a closing position to cover the taking lens and an opening position to expose the taking lens, a slide member which integrates a locking portion preventing a shutter button from being pushed down and a stopper limiting the push-down movement amount of the shutter button and moves together with the lens barrier and wherein the locking portion prevents the shutter button from being pushed down when the lens barrier is positioned at a position other than the opening position and the locking position retracts so that the shutter button can be pushed down when the lens barrier is positioned at the opening position and the stopper limits the push-down movement amount of the shutter button.

Moreover, to achieve the above-described objects, the present invention comprises a camera case provided with a taking lens, a lens barrier which is slidably supported at the front surface of the camera case and moves back and forth between a closing position to cover the taking lens and an opening position to expose the taking lens, a slide member which includes a locking portion slidably supported at the camera case and preventing a shutter button from being pushed down, contacts the lens barrier in the vicinity of the opening position of the lens barrier and slides together with the lens barrier to retract the locking portion from the locking position of the shutter button when the lens barrier moves to the opening position so that the shutter button can be pushed down.

Furthermore, to achieve the above-described objects, the present invention comprises a camera case provided with the taking lens, a lens barrier which is slidably supported at the front surface of the camera case and moves back and forth between a closing position to cover the taking lens and an opening position to expose the taking lens, a strobe button which is supported at the camera case in such a state that the strobe button can be pushed down and charges a strobe light-emitting portion when being pushed down, a locking member which moves together with the lens barrier and prevents the strobe button from being pushed down when the lens barrier is positioned at the closing position and releases the lock of the strobe button so as to make it possible for the strobe button to be pushed down when the lens barrier is positioned at the opening position.

According to the present invention, the slide member includes the locking portion which locks the shutter button and the stopper limiting the push-down movement amount of the shutter button. The slide member moves together with the lens barrier, and the locking portion prevents the shutter button from being pushed down when the lens barrier is positioned at a position other than the opening position. And, when the lens barrier is positioned at the opening position, the locking portion retracts so that the strobe button can be pushed down, and the stopper limits the push-down movement amount of the shutter button.

And, according to the present invention, the slide member is slidably supported at the camera case. The slide member contacts the lens barrier in the vicinity of the opening position of the lens barrier, and when the lens barrier moves from the contacting position in the direction of the opening position, the slide member slides. As a result, the locking portion provided in the slide member retracts from the locking position of the shutter button so that the shutter button can be pushed down. Therefore, the moving amount of the slide member can be predetermined within the range from the position where the lens barrier contacts the slide member to the opening position of the lens barrier.

Moreover, according to the present invention, the lens barrier is slidably supported on the outer wall of the camera case so as to be movable between the closing position and the opening position. The strobe button is supported at the camera case in such a state that the strobe button can be pushed down, and when the strobe button is pushed down, the strobe light-emitting portion is charged. When the lens barrier is positioned at the closing position, the locking member locks the strobe button to prevent the strobe button from being pushed down. And, when the lens barrier is positioned at the opening position, the locking member releases the lock of the strobe button so that the strobe button can be pushed down. Thus, the structure can be simplified by the push-down strobe button, and when the lens barrier moves to the closing position, the strobe button is locked so as to be prevented from being pushed down.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF PREFERRED EMBODIMENTS

Detailed description will hereunder be given of preferred embodiments of a camera with a lens barrier according to the present invention with reference to the accompanying drawings.

Figure 1:
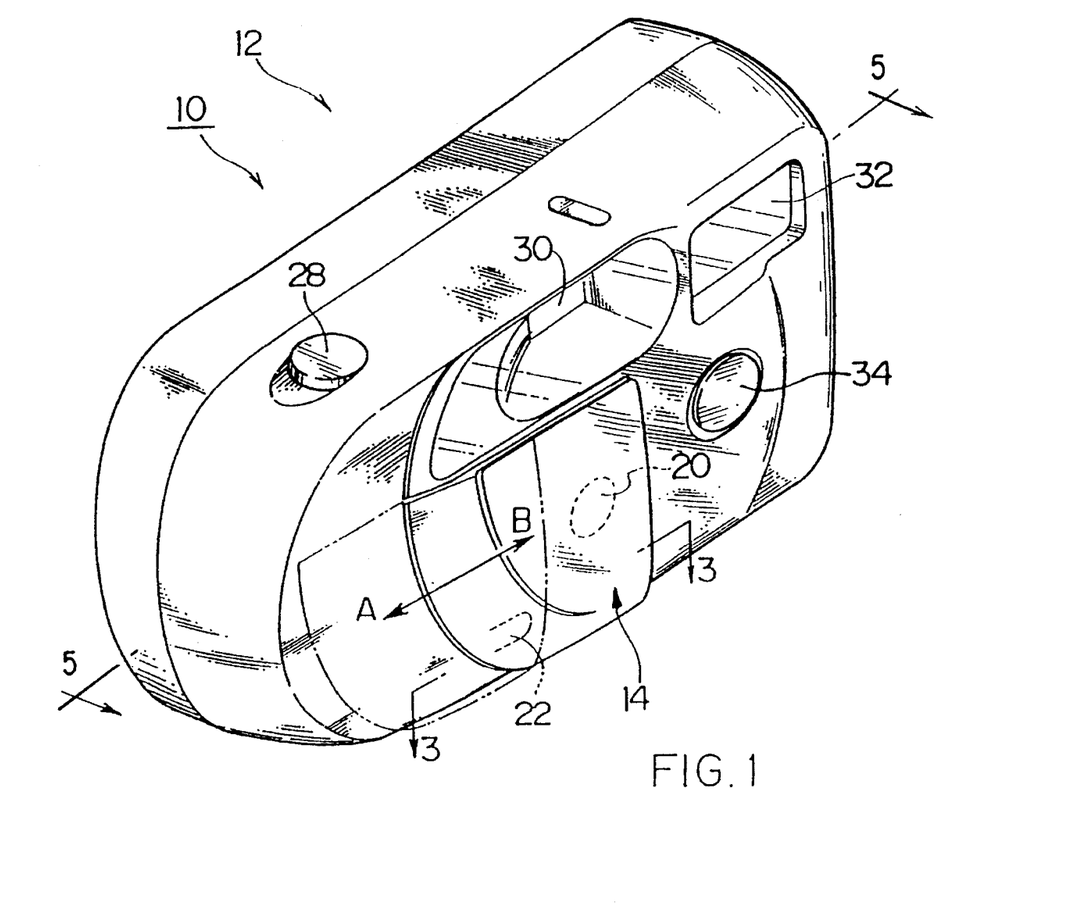
FIG. 1 is a perspective view illustrating the entire structure of a camera with a lens barrier according to the present invention.
Figure 2:
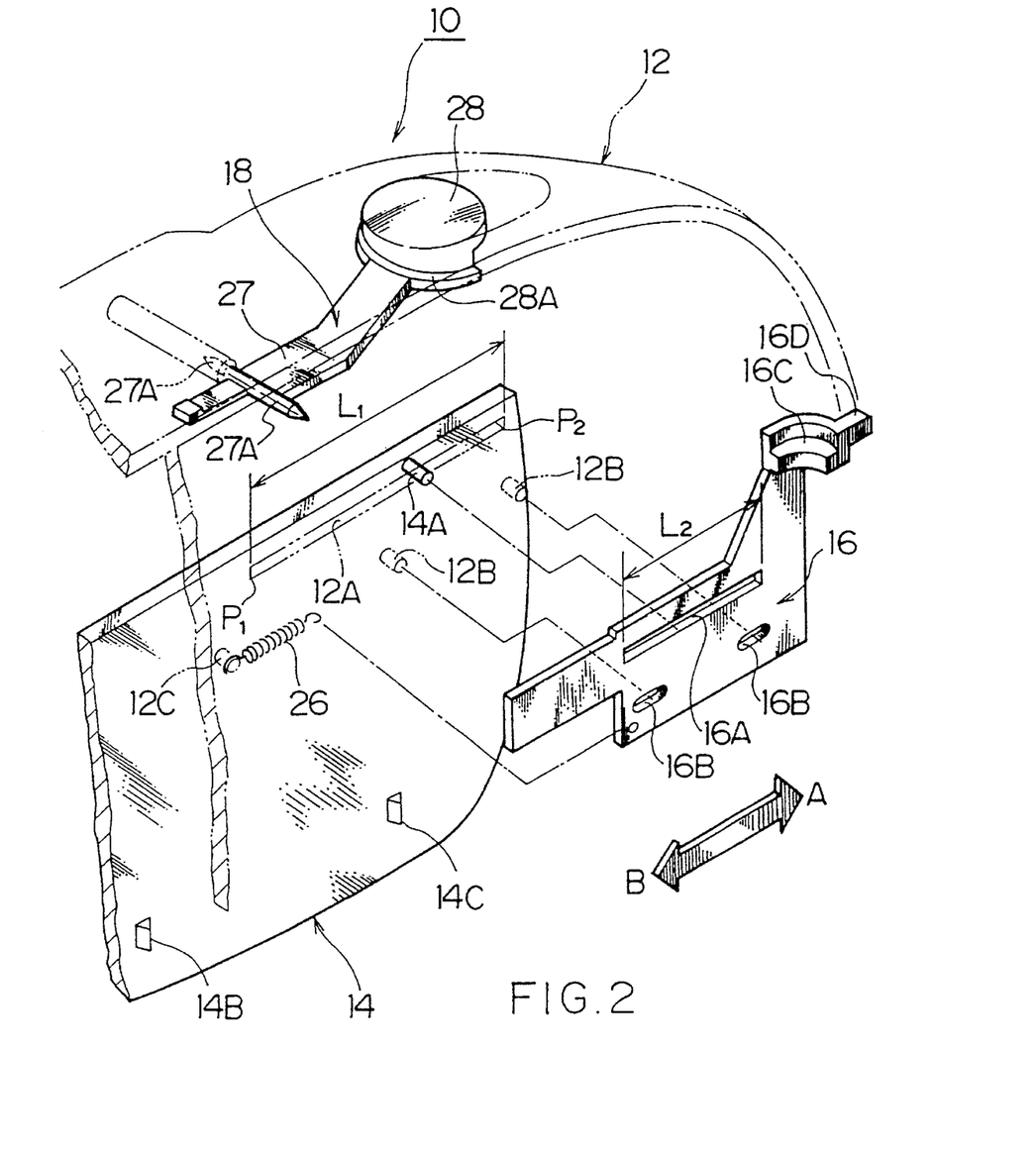
FIG. 2 is an enlarged, exploded view illustrating main portions of the camera shown in FIG. 1.

FIG. 1 is a perspective view illustrating the structure of a camera with a lens barrier according to the present invention, and FIG. 2 is an enlarged, exploded view illustrating main portions of the camera shown in FIG. 1. As shown in FIG. 2, a camera 10 with lens barrier is provided with a camera case 12, a lens barrier 14, a slide member 16, and a shutter button member 18. As shown in FIG. 1, the camera case is substantially rectangle-shaped, and a taking lens 20 is provided at the center of the front wall of the camera case 12. The lens barrier 14 is slidably supported at the front wall of the camera case 12. Engagement pawls (not shown in the drawing) are formed at the top and bottom portions of the lens barrier 14, and these engagement pawls are slidably engaged with guide grooves (not shown in the drawing) of the camera case 12. The guide grooves extend in the direction parallel to the arrow A–B of FIG. 1.

Furthermore, a pin 14A is formed at the back surface of the lens barrier 14, and the pin 14A is slidably engaged with a slit 12A formed in the camera case. As a result, the lens barrier 14 is supported at the front wall of the camera case 12 to be slidable in the direction of the arrow A–B, and the moving amount of the lens barrier in the direction of the arrow A–B is limited by the length $L_1$ of the slit 12A. And, when the pin 14A is positioned at the left end $P_1$ of the slit 12A, the lens barrier 14 is positioned at a closing position to cover the taking lens 20, and when the pin 14A is positioned at the right end $P_2$ of the slit 12A, the lens barrier 14 is positioned at an opening position to expose the taking lens 20.

Figure 3:
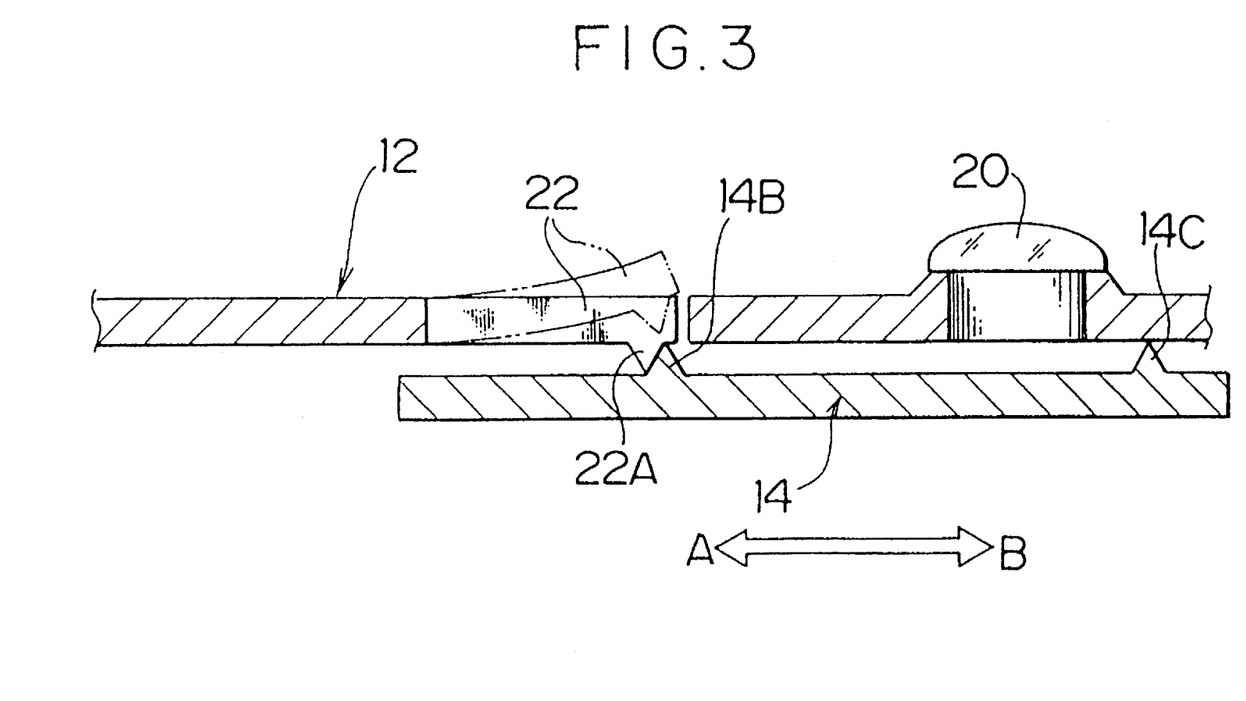
FIGS. 3 and 4 are section views along line 3—3 of FIG. 1 showing the lens barrier in the closed position and open position, respectively.
Figure 4:
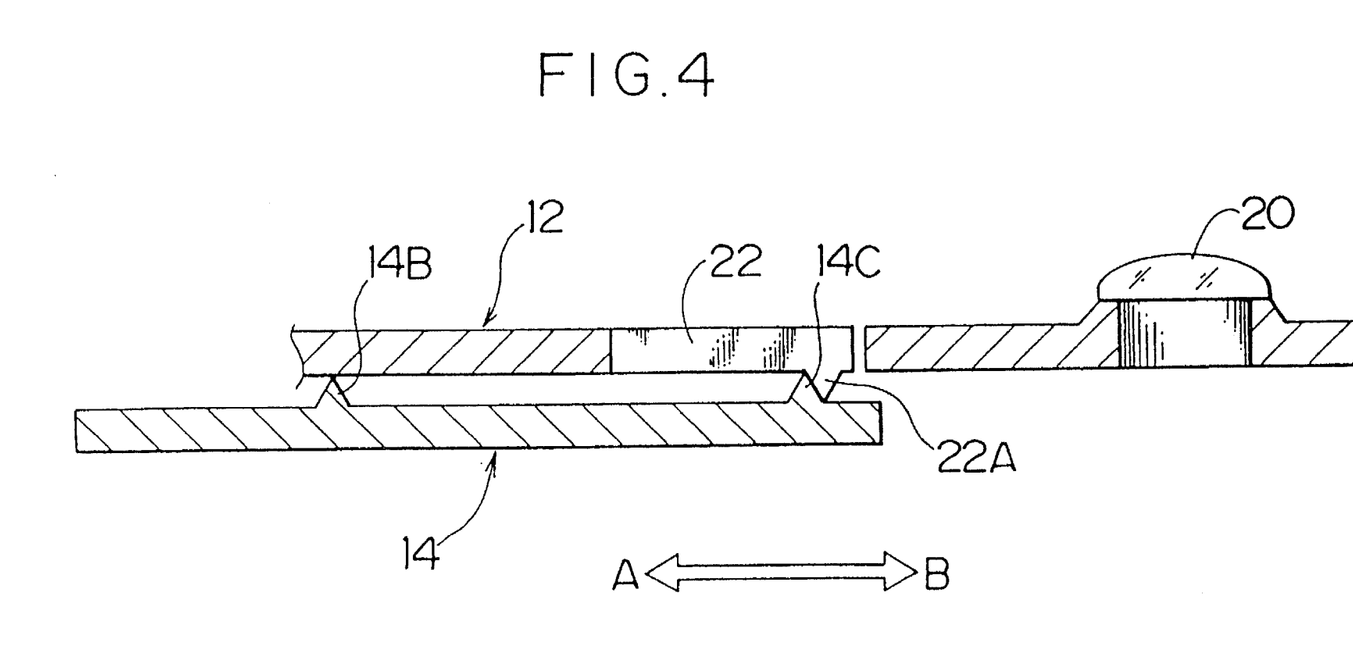
Figure 5:
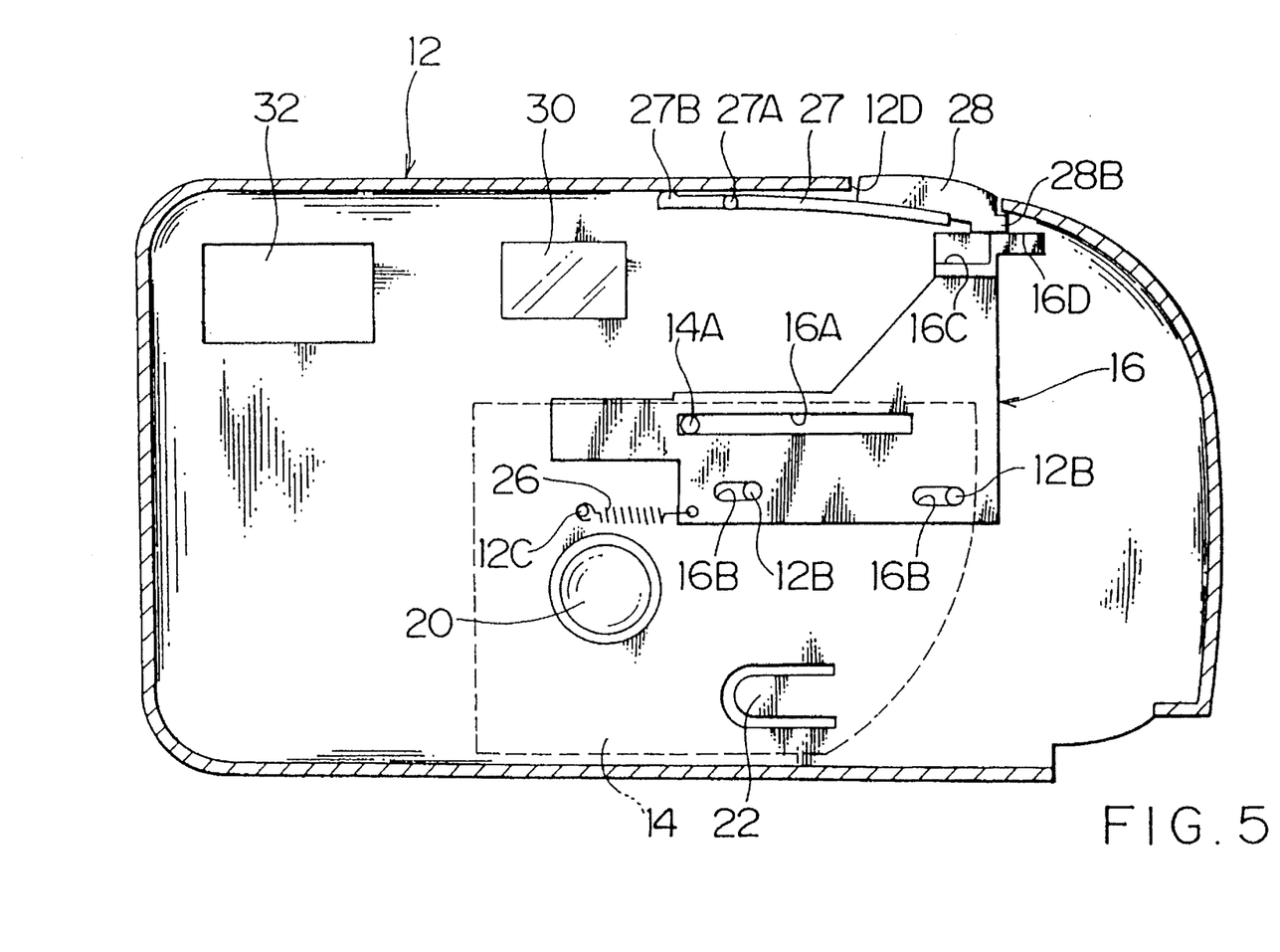
FIGS. 5 and 6 are section views along line 5—5 in FIG. 1 explaining the operation of a camera with a lens barrier according to the present invention.
Figure 6:
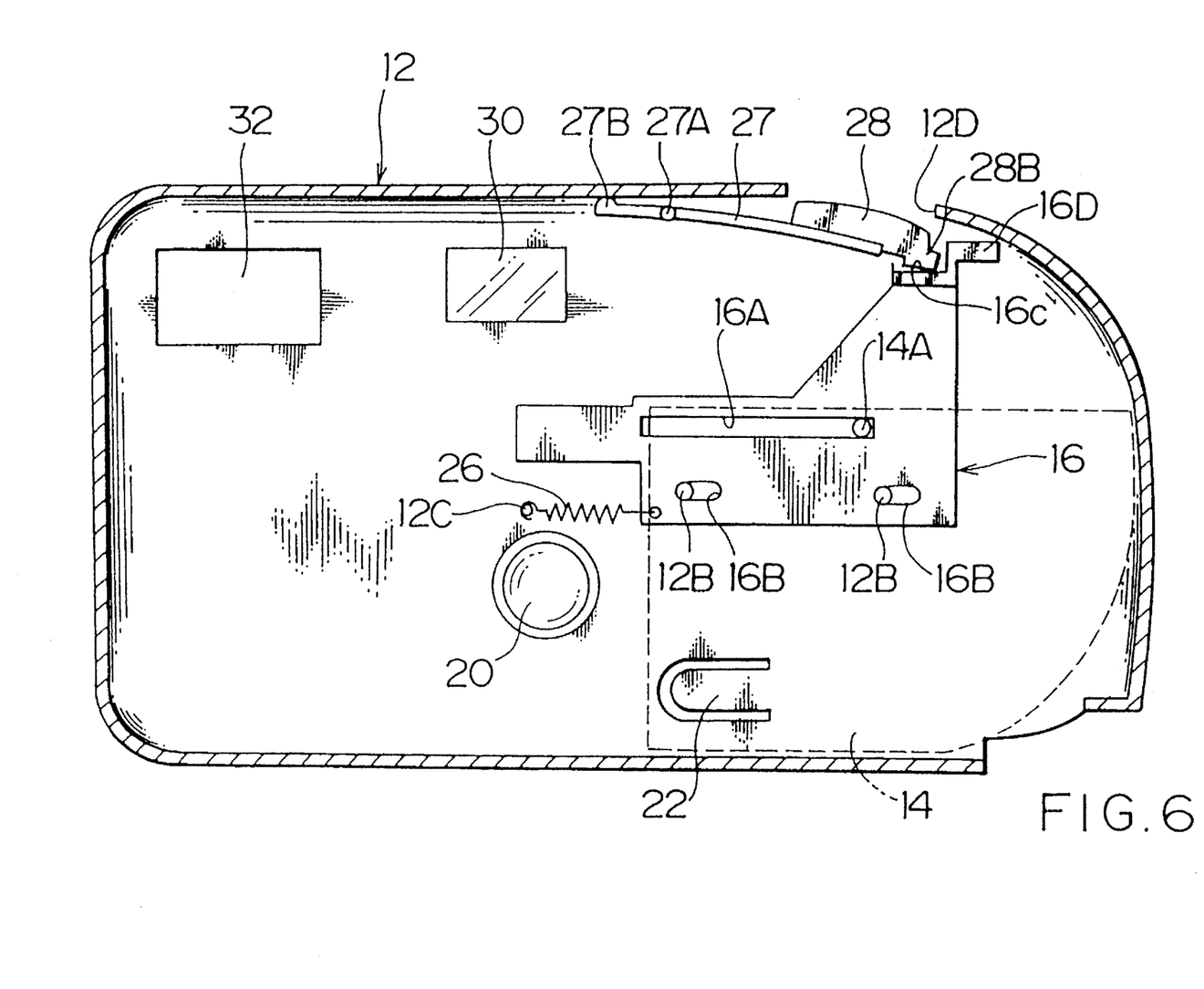

As shown in FIGS. 2, 3, and 4, projections 14B and 14C are formed on the back surface of the lens barrier 14. As shown in FIGS. 1, 5, and 6, a springy portion 22 is formed on the front wall of the camera case 12, and a projection 22A is formed at the end of the springy portion 22 (refer to FIGS. 3 and 4). When the lens barrier 14 is positioned at the closing position as shown in FIG. 1, the projection 14B contacts the right side of the projection 22A, as shown in FIG. 3, and the lens barrier 14 is kept locked at the closing position. In this case, the pin 14A in FIG. 2 is positioned at the left end $P_1$ of the slit 12A.

When the lens barrier 14 moves from the closing position in the direction of the arrow A to expose the taking lens 20, the projection 22A is pushed by the projection 14B and the spring portion 22 is bent into the camera case 12 (refer to FIG. 3). When the spring portion 22 is bent, the projection 14B moves in the direction of the arrow A passing over the projection 22A. And, when the lens barrier 14 reaches the opening position, the projection 14C contacts the projection 22A and the projection 22A is pushed by the projection 14C. As a result, the spring portion 22 is bent into the camera case 12, and the projection 14C passes over the projection 22A to be positioned at the left side of the projection 22A, and the lens barrier 14 is kept locked at the opening position (refer to FIG. 4). In this case, the pin 14A in FIG. 2 is positioned at the right end $P_2$ of the slit 12A.

The pin 14A is also slidably engaged with a slit 16A, as shown in FIGS. 2, 5, and 6, and the slit 16A is formed in slide member 16. The slide member 16 is provided inside the front wall of the camera case 12 to face the lens barrier 14, and a pair of long holes 16B and 16B are formed on one line at the lower portion of the slide member 16 and in parallel with the slit 16A. Guide pins 12B and 12B are respectively engaged with long holes 16B and 16B, and the guide pins 12B and 12B are formed to protrude on the inner front wall of the camera case 12. As a result, the slide member 16 is movably supported by the camera case 12 so as to slide in the direction of the arrow A–B within the range of the length of the long holes 16B.

A coil spring 26 is attached to the left end of the slide member 16, and the coil spring 26 is connected with the camera case 12 by the pin 12C. Therefore, the slide member 16 is pulled in the direction of the arrow B by the force of the coil spring 26, and the guide pins 12B and 12B respectively contact the right ends of long holes 16B and 16B (refer to FIG. 5). And, the length $L_2$ of the slit 16A is set shorter than that of the slit 12A. Furthermore, a stopper 16C is formed as a depression at the upper right end of the slide member 16, and a locking portion 16D is formed above and outside the stopper 16C.

The stopper 16C is formed to be engageable with the shutter button 28 as explained later, and the bottom end of the shutter button 28 contacts the bottom portion of the stopper 16C, and the push-down movement amount of the shutter button is limited. A projection 28B of the shutter button 28 is formed near the stopper 16C such that the projection 28B of the shutter button 28 rests against the locking portion 16D. When the projection 28B rests against the locking portion 16D, push-down of the shutter button 28 is prevented. Thus, the stopper 16C is integrated with the locking portion 16D.

When the slide member 16 is pulled in the direction of the arrow B by the coil spring 26 and the guide pins 12B and 12B respectively contact the right ends of long holes 16B and 16B, the left end of the slit 16A is positioned outside the left end $P_1$ of the slit 12A and the right end of the slit 16A for operation is positioned inside the right end $P_2$ of the slit 12A. Therefore, when the lens barrier 14 is positioned at the closing position in this state (FIG. 5), the pin 14A contacts the left end $P_1$ of the slit 12A, but not the left end of the slit 16A for operation, so the slide member 16 does not move. In this case, the locking portion 16D is positioned below the projection 28B of the shutter button 28 and the locking portion 16D contacts the projection 28B of the shutter button 28 (refer to FIG. 5).

On the other hand, when the lens barrier 14 moves in the direction of the opening position of the taking lens 20, the pin 14A moves together with the lens barrier 14 in the direction of the arrow A in the slit 12A and the slit 16A. Since the right end of the slit 16A is positioned inward from the right end of the slit 12A, when the lens barrier 14 moves in the vicinity of the opening position, the pin 14A contacts the right end of the slit 16A for operation and the pin 14A pushes the slide member 16 in the direction of the arrow A against the force of the coil spring 26.

As a result, the locking portion 16D moves in the direction of the arrow A, and moves away from the projection 28B of the shutter button 28. And, the stopper 16C is positioned below the projection 28B of the shutter button 28 so that the shutter button can be pushed down a predetermined amount into the depression of the stopper 16C (refer to FIG. 6). Thus, the slide member 16, which integrates the stopper 16C and the locking portion 16D, is formed separately from the lens barrier 14, so the moving amount of the slide member 16 is small. And, only when the lens barrier 14 is completely opened can the shutter button 28 be pushed down into the depression of the stopper 16C, so it is possible to prevent the mismanaged photographing when the lens barrier is half opened.

As shown in FIG. 2, shutter button member 18 is made of resilient material such as resin, etc., and is provided with a lever portion 27 and the shutter button 28. Pins 27A and 27A are formed along the same axis at opposite sides of the lever portion 27. Pins 27A and 27A are rotatably supported on the upper wall of the camera case 12, and the end 27B of the lever portion 27 contacts the upper wall of the camera case 12 (refer to FIGS. 5 and 6). And, the cylindrical shutter button 28 is formed at the right end of the lever portion. The shutter button 28 extends through an opening hole 12D which is formed in the upper wall of the camera case 12. A flange 28A, whose diameter is larger than that of the opening hole 12D, is formed at the outer periphery of the bottom end of the shutter button 28 (refer to FIG. 2).

Accordingly, the flange portion 28A contacts the inner wall of the opening hole 12D. As a result, the shutter button 28 is positioned at a predetermined height, the surface of the shutter button 28 is substantially the same as that of the camera case. When the lens barrier 14 is positioned at the closing position to cover the taking lens 20 in this state, the projection 28B of the shutter button 28 contacts the locking portion 16D (refer to FIG. 5), and push-down of the shutter button 28 is prevented.

When the lens barrier 14 is positioned at the opening position to expose the taking lens 20, the locking portion 16D moves away from below the projection 28B of the shutter button 28, and the stopper 16C is positioned below the projection 28B of the shutter button 28. Therefore, when the shutter button 28 is pushed, the lever portion 27 is elastically deformed so that the shutter button 28 can be pushed down by a predetermined amount into the depression of the stopper 16C (refer to FIG. 6). When the pushing force on the shutter button 28 is released, the lever portion 27, which has been elastically deformed, returns to normal, and the surface of the shutter button 28 is substantially the same as that of the camera case.

Incidentally, 30 is a view finder, 32 strobe, and 34 is a strobe operating button in FIG. 1.

An explanation will be given of the operation of the camera with the lens barrier according to the present invention structured as described above. First, an explanation will be given of the case when the lens barrier 14 is positioned at the closing position to cover the taking lens 20. In this case, the slide member 16 is pulled in the direction of the arrow B by the force of the coil spring 26, and the guide pins 12B and 12B respectively contact the right ends of long holes 16B and 16B. As a result, the locking portion 16D is positioned below the projection 28B of the shutter button 28, and the locking portion 16D contacts the projection 28B of the shutter button 28 (refer to FIG. 5). Therefore, the shutter button 28 is kept locked so that push-down of the shutter button 28 can be prevented.

Next, an explanation will be given of the case when the lens barrier moves from the closing position to the opening position to expose the taking lens 20. When the lens barrier 14 moves in the direction of the opening position, the pin 14A moves together with the lens barrier in the direction of the arrow A in the slit 12A and the slit 16A. Since the right end of the slit 16A is positioned inward from that of the slit 12A, when the lens barrier 14 moves close to the opening position, the pin 14A contacts the right end of the slit 16A for operation. Therefore, the pin 14A pushes the slide member 16 in the direction of the arrow A against the force of the coil spring 26.

As a result, the locking portion 16D moves away from the projection 28B of the shutter button 28, and the stopper 16C is positioned below the projection 28B of the shutter button 28. Therefore, the locked state of the shutter button 28 is released, and the shutter button 28 can be pushed down a predetermined amount into the stopper 16C (refer to FIG. 6). Thus, the slide member 16, which integrates the stopper 16C and the locking portion 16D, is formed separately from the lens barrier so that the moving amount of the slide member 16 can be small. And, only when the lens barrier 14 is completely opened can the shutter button 28 be pushed down into the depression of the stopper 16C, so it is possible to prevent the mismanaged photographing, etc. when the lens barrier 14 is half opened.

Figure 7:
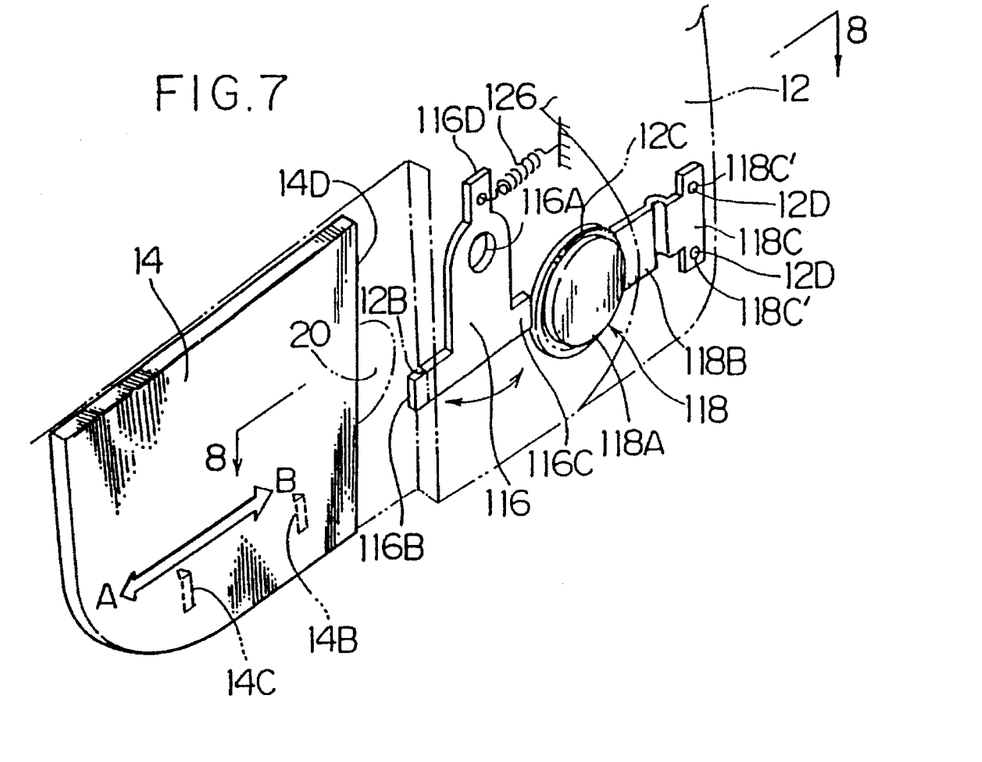
FIG. 7 is a perspective view illustrating a camera with a lens barrier configured to lock the strobe button according to the present invention.
Figure 8:
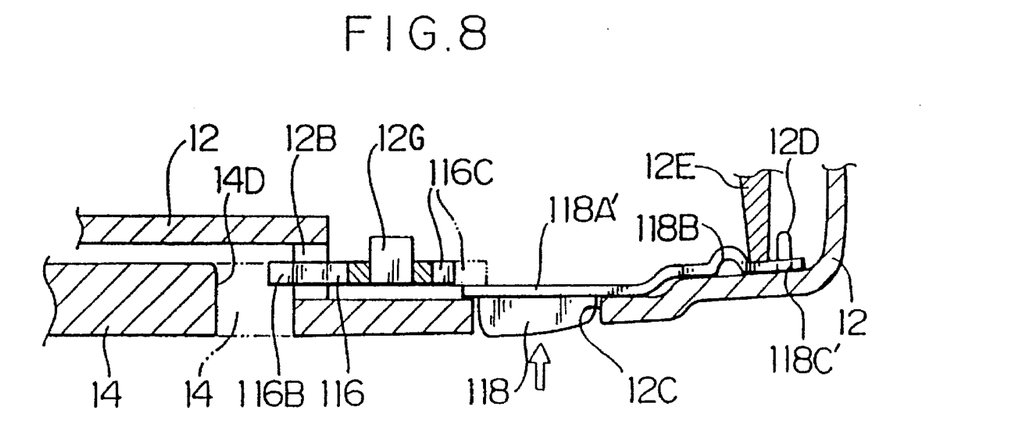
FIG. 8 is a section view along line 8—8 in FIG. 7.

Moreover, as shown in FIG. 7, a camera with a lens barrier according to the present invention is provided with a lock member 116 and a strobe button member 118. A strobe button 118A of the strobe button member 118 is connected to connecting portion 118C via a springy portion 118B. The strobe button 118A protrudes through the opening hole 12C of the camera case 12, and a flange 118A' contacts the inner wall of the camera case 12. As a result, the surface of the strobe button 118A is substantially the same as that of the camera case 12 (refer to FIG. 8).

Projections 12D and 12D are engaged with a pair of opening holes 118C' and 118C' of the connecting portion 118C, and projections 12D and 12D are formed on the inner surface of the camera case 12. As a result, the connecting portion 118C is attached at the inner surface of the camera case 12. Moreover, the springy portion 118B at the left side of the connecting portion 118C is held by the projection 12E (refer to FIG. 8). Therefore, when a pushing force acts on the strobe button 118A in the direction of the arrow from outside the camera case, the springy portion 118B is elastically deformed, and the strobe button 118A is pushed into the camera case 12.

As a result, a charge switch works, and a capacitor for the strobe is charged with a predetermined amount of electricity. When the shutter button 28 is pushed down in this state, the strobe 32 (refer to FIG. 1) emits light. On the other hand, when the pushing force on the strobe button 118A is released, the springy portion 118B, which has been elastically deformed, returns to normal, and the surface of the strobe button 118A returns to the position to be substantially the same as that of the camera case 12 (refer to FIG. 8).

As shown in FIG. 7, the lock member 116 is provided between the lens barrier 14 and the strobe button 118A. The lock member 116 is substantially upside down T-shaped, and an opening hole 116A is formed at the top end of the lock member 116. The opening hole 116A is rotatably engaged with a projection 12G. The projection 12G is formed at the inner surface of the camera case 12 between the lens barrier 14 and the strobe button 118A.

A left side end portion 116B and a right side end portion 116C protrude at the bottom end of the lock member 116. Moreover, an end portion 116D is formed at the top end of the lock member 116, and the end portion 116D connects with the left end of a tension spring 126. The camera case 12 engages with the right end of the tension spring 126.

As a result, the lock member 116 is pulled clockwise by the force of the tension spring 126, so the left side end portion 116B protrudes out of the camera case 12 through an opening groove 12B in the camera case 12. In this case, the right side end portion 116C is moved away from the strobe button 118A. And, the opening groove 12B is formed at a step portion of the camera case 12, and this step portion is formed so as to face the right edge of the lens barrier 14.

An explanation will be given of the operation of the camera with the lens barrier according to the present invention structured as described above. When the lens barrier 14 is positioned at the position to cover the taking lens 20, the right edge 14D of the lens barrier 14 contacts the left side end portion 116B and the left side end portion 116B is pushed into the camera case 12. Therefore, the lock member 116 rotates counterclockwise around the projection 12G against the force of the tension spring 126 (refer to FIG. 7). As a result, the right side end portion 116C overlaps and contacts the back surface of the strobe button 118A, so push-down of the strobe button 118A is prevented by the right side end portion 116C.

When the lens barrier 14 moves from the closing position in the direction of the opening position to expose the taking lens 20, contact between the edge 14D of the lens barrier 14 and the left side end portion 116B is removed, and the lock member 116 rotates clockwise due to the force of the tension spring 126. Therefore, the left side end portion 116B protrudes out of the camera case through the opening groove 12B, and the right side end portion 116C moves away from the back surface of the strobe button 118A. As a result, when the strobe button 118A is pushed from outside the camera case 12, the strobe button 118A is pushed into the camera case 12, and the charge switch works and the capacitor for the strobe is charged with a predetermined amount of electricity.

Figure 9:
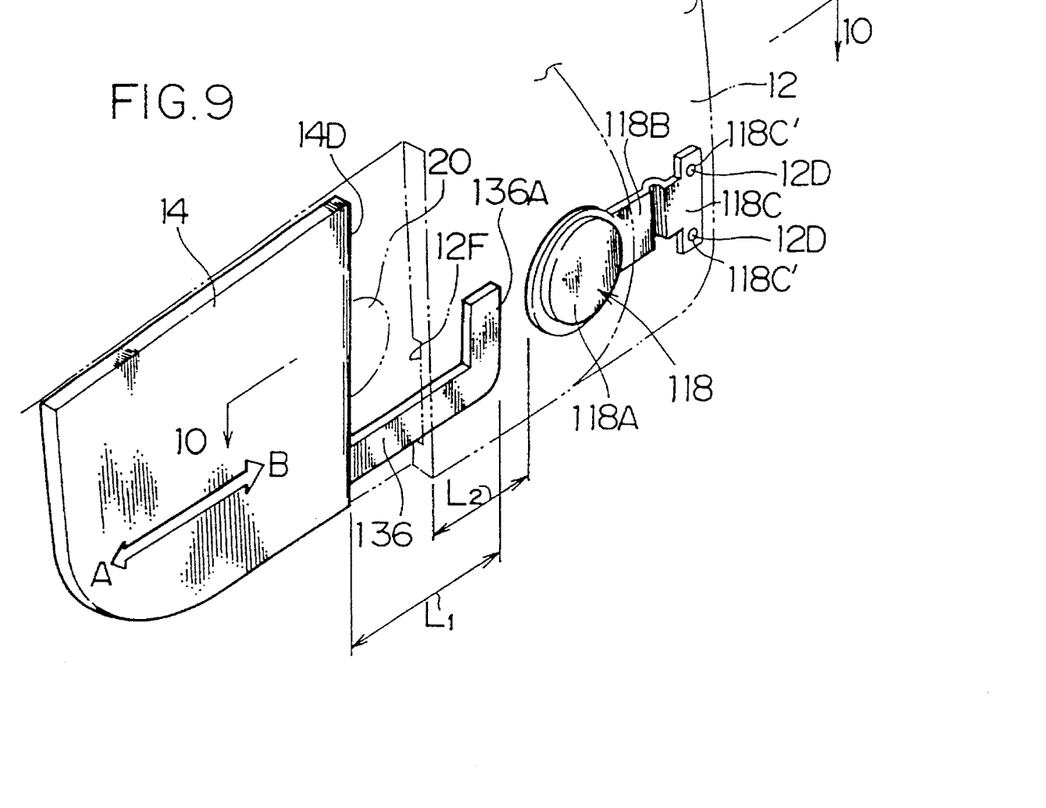
FIG. 9 is a section view illustrating another camera with a lens barrier configured to lock the strobe button according to the present invention.
Figure 10:
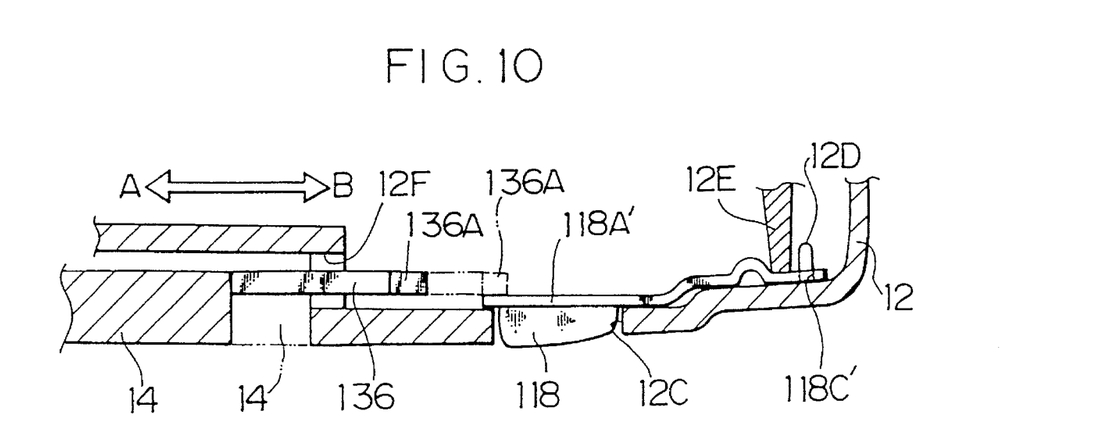
FIG. 10 is a section view along line 10—10 in FIG. 9.

The explanation was given of the case that the lock member 116 is rotatably supported by the camera case 12, but as shown in FIGS. 9 and 10, the locking portion can be structured to be integrated with the lens barrier. An explanation will hereunder be given of other embodiments with reference to FIGS. 9 and 10. Here, the same reference numerals are put on members in FIGS. 9 and 10 which are similar to those of the above-described embodiment, and an explanation will be omitted of them. Substantially L-shaped locking portion 136 is integrated with the right edge 14D of the lens barrier 14. The length $L_1$ is predetermined to be longer than the distance $L_2$ from the step portion of the camera case 12 to the strobe button 118A.

An opening groove 12F is formed at the step portion of the camera case 12, and the opening groove 12F is opened so that the locking portion 136 can be inserted into the opening groove 12F. Therefore, when the right edge 14D of the lens barrier 14 moves close to the step portion of the camera case 12, the locking portion 136 moves into the camera case 12 via the opening groove 12F. When the lens barrier 14 moves to the closing position (where the right edge 14D of the lens barrier 14 contacts the step of the camera case 12), a forward end 136A of the locking portion 136 overlaps the strobe button 118A while contacting the back surface of the strobe button 118A. As a result, push-down of the strobe button 118A is prevented by the forward end 136A of the locking portion 136.

When the lens barrier 14 moves from the closing position toward the opening position (the direction of the arrow A in FIGS. 9 and 10), the locking portion 136 moves together with the lens barrier 14 in the direction of the arrow A. Therefore, the locking portion 136 moves away from the back surface of the strobe button 118A, so the overlapping of the forward end 136A of the locking portion 136 and the strobe button 118A is removed. As a result, the strobe button 118 can be pushed down.

As described above, according to the present invention, the locking portion for locking the shutter button and the stopper for regulating the push-down movement amount of the shutter button are integrated in the slide member. This slide member moves together with the lens barrier, and when the lens barrier moves to a position other than the opening position, the locking portion makes it impossible to push down the shutter button. When the lens barrier is positioned at the opening position, the locking portion moves away from the shutter button to make it possible to push down the shutter button and the stopper regulates the push-down movement amount of the shutter button.

Thus, the locking portion for locking the shutter button and the stopper for regulating the push-down movement amount of the shutter button are integrated, so that the number of parts can be reduced to lower the production cost.

Moreover, as explained above, according to the present invention, the slide member is slidably supported by the camera case. The slide member contacts the lens barrier in the vicinity of the opening position of the lens barrier, and when the lens barrier moves from the contacting position in the direction of the opening position, the slide member slides. In this case, the locking portion, which is provided in the slide member, moves away from the locking position by the shutter button so that the shutter button can be pushed down.

Accordingly, the amount by which the slide member moves can be made small within the range between the position where the lens barrier contacts the slide member and the opening position of the lens barrier. As a result, it is possible to minimize the range of movement of the locking portion in the camera case for making the most use of and freely designing the space in the camera case.

Furthermore, as described above, according to the present invention, the strobe button is supported by the camera case such that the strobe button can be pushed down into the camera case, and the strobe light-emitting portion is charged when the strobe button is pushed down. When the lens barrier is positioned at the closing position, the strobe button is kept locked by the locking member so that the strobe button is prevented from being pushed down. When the lens barrier is positioned at the opening position, the locking portion releases the strobe button so that the strobe button can be pushed down.

As mentioned above, the strobe button is a push-down type so that the structure can be simplified. And, when the lens barrier is positioned at the closing position, the strobe button is kept locked so that the strobe button can be prevented from being pushed down. Therefore, it is possible to prevent the strobe light-emitting portion from charging by preventing push-down of the strobe button before the photographing.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera including a lens and a shutter release control button, said camera comprising:

a case;

a lens barrier slidably mounted to said case so as to be slid by a user from a first, closed position in which said lens is covered by said lens barrier to a second, open position in which said lens is exposed for taking pictures; and a slide member slidably supported by said case and having a locking portion and a stopper portion integrally formed therewith, said slide member being linked to said lens barrier so as to slide with said lens barrier;

whereby when said lens barrier is positioned at a position other than said second, open position, said slide member is positioned such that said locking portion prevents said shutter release control button from being depressed, and when said lens barrier is positioned at said second, open position, said slide member is positioned such that said stopper portion allows said shutter release control button to be depressed but limits the amount by which said shutter release control button can be depressed, preventing and limiting of depression of said shutter release control button thereby being effected by a single, unitary member.

2. The camera as set forth in claim 1, wherein said stopper portion is formed as a depression such that depression of said shutter release control button is limited by engagement of said shutter release control button with a bottom part of said depression.

3. The camera of claim 1 wherein said shutter release control button comprises a button portion supported by a flexural lever portion and wherein said stopper portion limits bending of said flexural lever portion.

4. The camera as set forth in claim 3, further comprising a spring member disposed so as to bias said slide member into a position in which said locking portion is positioned so as to prevent said shutter button from being depressed.

5. The camera as set forth in claim 4 wherein as said lens barrier approaches said second, open position and said pin contacts the end of said slot, said slide member moves, with said lens barrier, against the force of said spring member and said locking portion moves away from said shutter button such that said shutter button can be depressed.

6. A camera including a lens and a shutter release control button, said camera comprising:

a case;

a slide member slidably supported by said case, said slide member having a slot and a locking portion which prevents said shutter release control button from being depressed; and a lens barrier slidably mounted to said case so as to be slid by a user from a first, closed position in which said lens is covered by said lens barrier to a second, open position in which said lens is exposed for taking pictures, said lens barrier having a pin configured to extend through the slot in said slide member;

said slide member and said lens barrier being configured and disposed such that as said lens barrier is slid from said first, closed position toward said second, open position, said pin slides along said slot, and as said lens barrier approaches said second, open position, said pin contacts and pushes against an end of said slot such that said slide member moves with said lens barrier.

7. The camera of claim 6 wherein said shutter release control button comprises a button portion supported by a flexural lever portion and wherein said locking portion prevents bending of said flexural lever portion.

* * * * *